Figure 1:
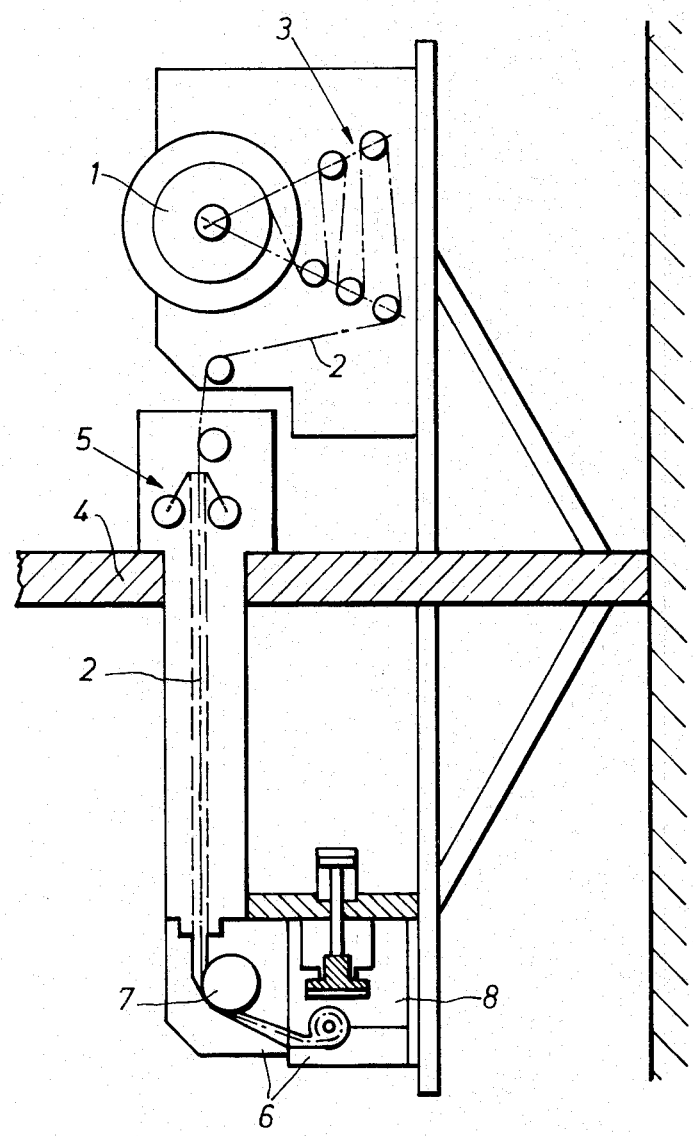

United States Patent [19]
Hoffacker et al.

[11] 3,910,516
[45] Oct. 7, 1975

[54] AUTOMATIC FILM-CASSETTE FABRICATION

[75] Inventors: Franz Hoffacker, Langenfeld; Heinz Johanns, Leverkusen; Horst Schruff, Muehlheim, all of Germany

[73] Assignee: Agfa-Gevaert Aktiengesellschaft, Leverkusen, Germany

[22] Filed: Jan. 29, 1974

[21] Appl. No.: 437,648

[30] Foreign Application Priority Data
Feb. 3, 1973   Germany............................ 2305383

[52] U.S. Cl............. 242/56 R; 242/67.3 R; 242/197
[51] Int. Cl....................... B65h 19/20; B65h 17/02
[58] Field of Search........ 242/56 R, 67.1 R, 67.3 R, 242/71.7, 197

[56] References Cited
UNITED STATES PATENTS

| | | | |
|---|---|---|---|
| 3,499,202 | 3/1970 | Napor | 242/67.3 R X |
| 3,586,258 | 6/1971 | Horlezeder | 242/56 R |
| 3,684,203 | 8/1972 | Tollkuhn | 242/67.3 R |

*Primary Examiner*—Edward J. McCarthy
*Attorney, Agent, or Firm*—Connolly and Hutz

[57] ABSTRACT

This invention relates to a machine for automatically winding films on to spools in cassettes. The cassettes are cylindrical and have a slot-shaped opening for introducing the film and attaching it to the film spool. The film spool is freely rotatable in the cassette. The most well-known cassettes of this kind are the almost universally available film cartridges for 35 mm microfilm.

13 Claims, 8 Drawing Figures

AUTOMATIC FILM-CASSETTE FABRICATION

This invention relates to a machine for automatically winding films on to spools in cassettes. The cassettes are cylindrical and have a slot-shaped opening for introducing the film and attaching it to the film spool. The film spool is freely rotatable in the cassette. The most well-known cassettes of this kind are the almost universally available film cartridges for 35 mm microfilm.

By means of the automatic winding machine according to the invention, a predetermined length of film is wound on to the film spool. The film is then cut and the full cassette ejected. The machine comprises a cassette chamber for accommodating the film cassettes, a device for threading the film into the cassette, a film-transport system and a winding drive for the film spool. Fully automatic loading of the cassettes with film an operation referred to here as cassette fabrication, involves a number of separate operations which have to be carried out in succession. Thus, the cassette chamber is used to prepare the empty film cassettes. The film is introduced through the slot-shaped opening into the cassette by means of the threading device and the film-transport system, and attached to the film spool. The winding drive is then switched on until the required length of film has been wound on. The film is then cut and the full cassette removed from the cassette chamber.

The individual operations are fairly complicated. In addition, the film is very sensitive to damage, and scratches and tears along the edges of the film must be avoided. Finally, the fabricating machine as a whole also has to be lightproof in cases where it is set up in a lit room. For all these reasons, the individual operations have hitherto been carried out manually or semi-automatically, full automation having involved considerable difficulties.

The object of the present invention is to provide a fully automatic machine for winding film onto spools in film cassettes which is highly reliable in operation and provides for careful treatment of the sensitive film.

According to the invention there is provided a machine for automatically winding a film on to a spool in a cassette, comprising a cassette chamber for receiving the film cassette, a threading device for the film, a film transport system and of a film winding drive, wherein:

a. the cassette chamber is displaceable transversely of the direction in which the film is transported thereby to enable to the chamber to be brought from a cassette-preparing position into a winding or threading position, b. during its displacement, the cassette chamber moves a telescopic winding shaft axially through mechanical control elements until it engaged by force with a film spool of the cassette and c. a control circuit is provided which initially actuates the threading device and the film transport system the beginning of the film being pushed through a film guide channel into the cassette where it automatically engages the film spool and then switches on the film winding drive.

In a prefered embodiment of the invention the threading device is distinguished:

a. by the fact that it comprises a leaf spring which is adapted, to be inserted into the cassette, being guided in a linear receiving duct in the cassette chamber;

b. by the fact that, after it has been inserted into the cassette, the leaf spring is curved towards the winding shaft on account of its spring force; and c. by the fact that the film-guide channel extends obliquely of the receiving duct and opens into the cassette opening on the inside of the partly curved surface of the leaf spring so that during threading the beginning of the film slides along the concave inner surface of the leaf spring and engages the fastening elements of the film spool.

The transverse movement of the cassette chamber is advantageously produced by a pneumatic piston. At the beginning of the winding operation, the pneumatic piston brings the cassette chamber into the winding position. After the required length of film has been wound on the film spool, the cassette chamber is returned to the starting position.

In one preferred embodiment, the distance between the cassette chamber and the end of the piston rod is variable. To this end, the end of the piston rod engages in a correspondingly shaped groove in a two-part intermediate member which is fixed to the cassette chamber. The two parts of the intermediate member are joined by helical springs and are adjusted relative to one another by means of adjusting screws.

The cassette chamber preferably contains the cassette receiver, the film-guide channels and the threading device. Advantageously it is in the form of a three-part block. The dividing line between the first and the second block extends along the middle line of the film-guide channel. By virtue of this arrangement, the second block can be displaced to a certain extent relative to the first block, thus enabling the film-guide channel to be widened. Displacement of the blocks relative to one another is again produced by a pneumatic control element.

After the required length of film has been wound on, the film has to be cut in the cassette chamber. In one advantageous embodiment, a fixed lower blade is mounted at the point where the film-guide channel enters the cassette chamber, whilst a resiliently mounted upper blade is mounted at the point where the film leaves the transport mechanism. The film is then automatically cut when the cassette chamber returns to its starting position.

According to another aspect of the invention, the transport system comprises a supporting block with film-guide channels. A driven toothed drum is provided in this supporting block, its teeth engaging in the perforations in the film. The toothed drum is driven by a rack drive which is actuated by a pneumatic force-locking element. The drive is such that it is only force-looking in the transport direction (i.e. in the winding direction) whilst the toothed drum rotates freely in the opposite direction.

In one particularly advantageous embodiment, the transport system is simultaneously used to measure the length of film to be wound on. In this case, the toothed drum is such that the length of film to be wound on is a whole multiple of the circumference of the toothed drum. The toothed drum itself is connected to a counter which controls the winding-on operation and, on completion of every winding-on operation, gives the command for the cassette chamber to be returned to the starting position.

When the transport system is stopped, measures must be taken to ensure that it remains in a certain holding position. Otherwise counting of the lengths of film would be inaccurate. For this purpose, a pivotal brake or positioning detent, in the form of a stop for a ratchet wheel fixedly mounted on the drum shaft, can be provided for stopping the toothed drum in a certain position.

At the beginning of winding, the film spool has to be oriented in such a way that inserted film automatically engages the spool. Accordingly the film spool has first to be turned into the correct position relative to the threading device. This can be achieved by applying a d.c. voltage to the synchronous motor of the winding drive and at the same time switching off the a.c. voltage. The switchover is made after the telescopic shaft connected to the synchronous motor has engaged the film spool. The effect of the d.c. voltage thus applied to the stator winding is to slow down the synchronous motor which comes to a stop in a certain holding position determined by the angular position of the rotor magnets relative to the stator winding.

The advantages afforded by embodiment of the invention lie in particular in the fully automatic operation of the winding machine which is possible. It has also been found that the machine can be made totally reliable in operation, even over prolonged periods, and that the film is exposed to hardly any risk of damage. The reliability of the threading device is of particular significance in this respect. It has to function satisfactorily even with films differing in their tendency to curl. In practice, the tendency of the films to curl and hence their curvature differ greatly. It has previously been proposed (in West German published patent application DOS 1,772,319 corresponding to U.S. Patent 3,586,258) to support the film on the convex outer surface of a curved guide tongue. However, it has not been successfully adopted in practice for the following reasons. During threading, the beginning of the film comes into contact with the film spool in the cassette. Due to the inserting force applied by the transport system, the film can lift itself off the guide tongue and miss the fastening elements on the film spool. On the other hand, any film with an inadequate curling tendency would not lie on the guide tongue at all and during threading would slide past the spool core altogether. In the preferred embodiment of the invention, the film slides along the convex inner surface of the guide tongue so that it cannot be deflected outwards. Since the guide tongue consists of a resilient material (in form of a leaf spring), it can be linearly guided in a positive guide, and by virtue of its spring tension, it assumes the required curvature after it has been inserted.

Another advantage of the invention is that the transport system can act simultaneously as a counter for the length of film wound on. In addition, the transport system also takes over the control function for attaching the beginning of the film exactly to the film spool. If the film is not fastened to the film spool, it is automatically pulled out of the cassette chamber and the threading operation repeated. This control function will be explained in more detail later on during the description of the exemplary embodiment. In addition to providing a compact structure and reliability in operation, the combination of these three functions affords the particular adantage that the film with its sensitive surface does not come into contact with additional control and counting elements.

The cassette chamber is an important part of the invention. It is designed in such a way that a single control element by which it is displaced carries out five functions one after the other. These functions are explained below with reference to a exemplary embodiment.

Figure 2:
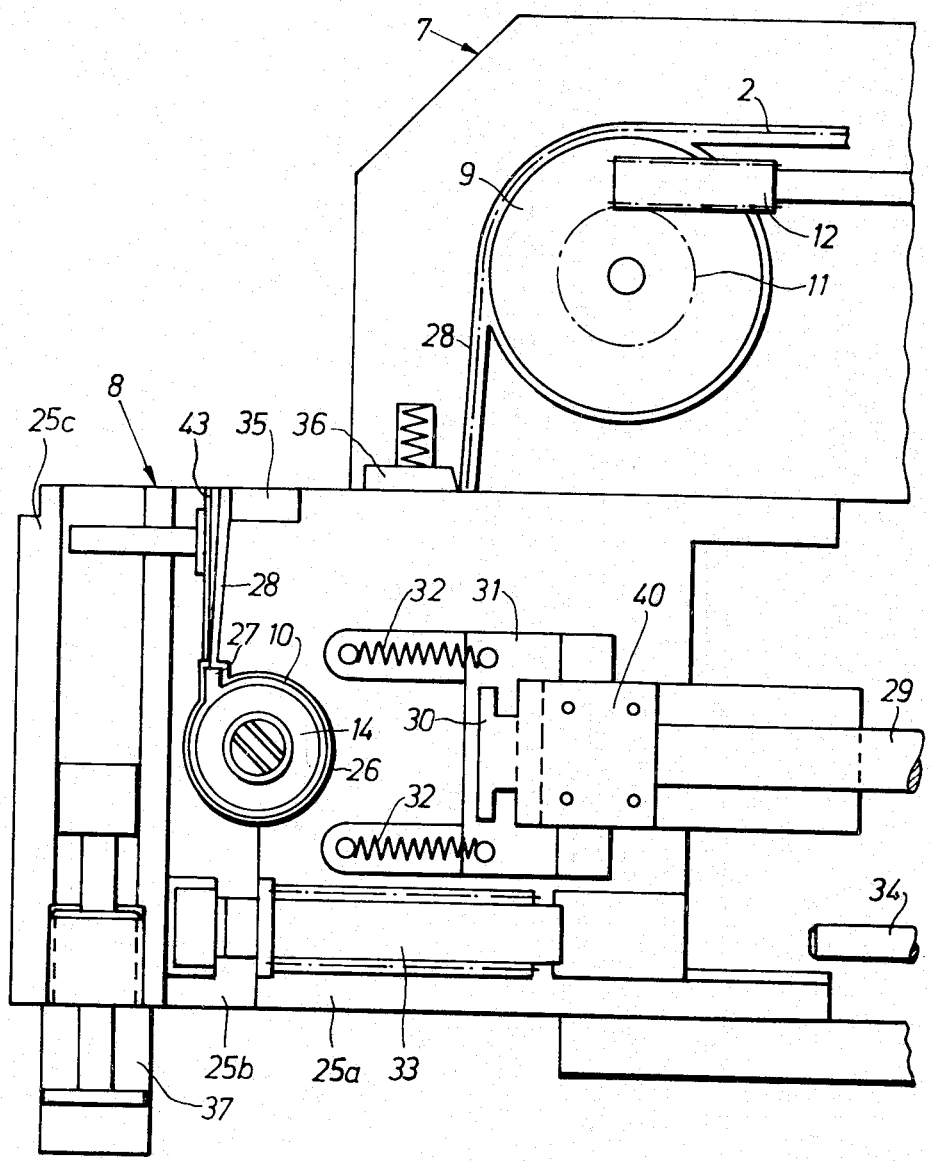
Figure 3:
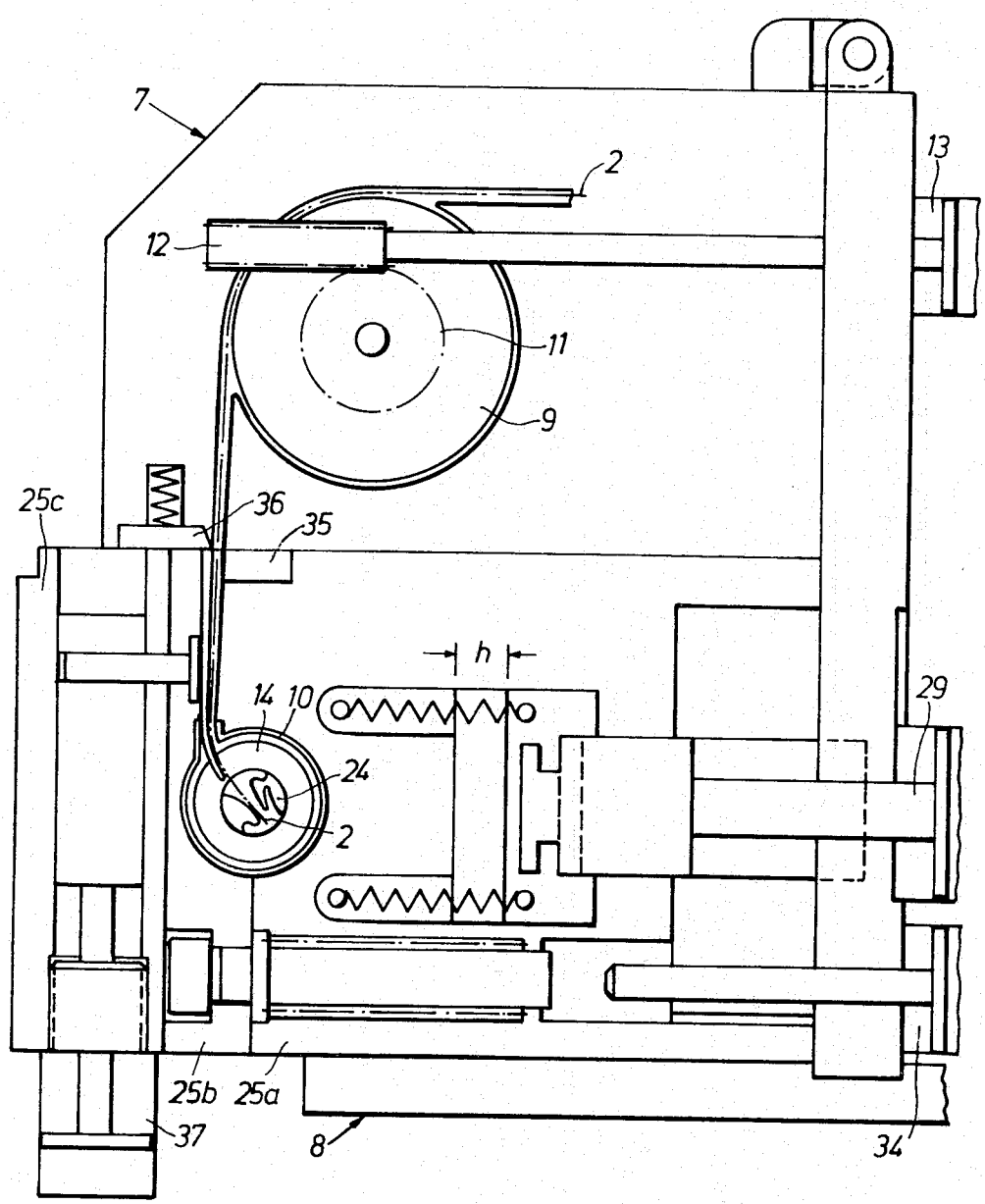
Figure 4:
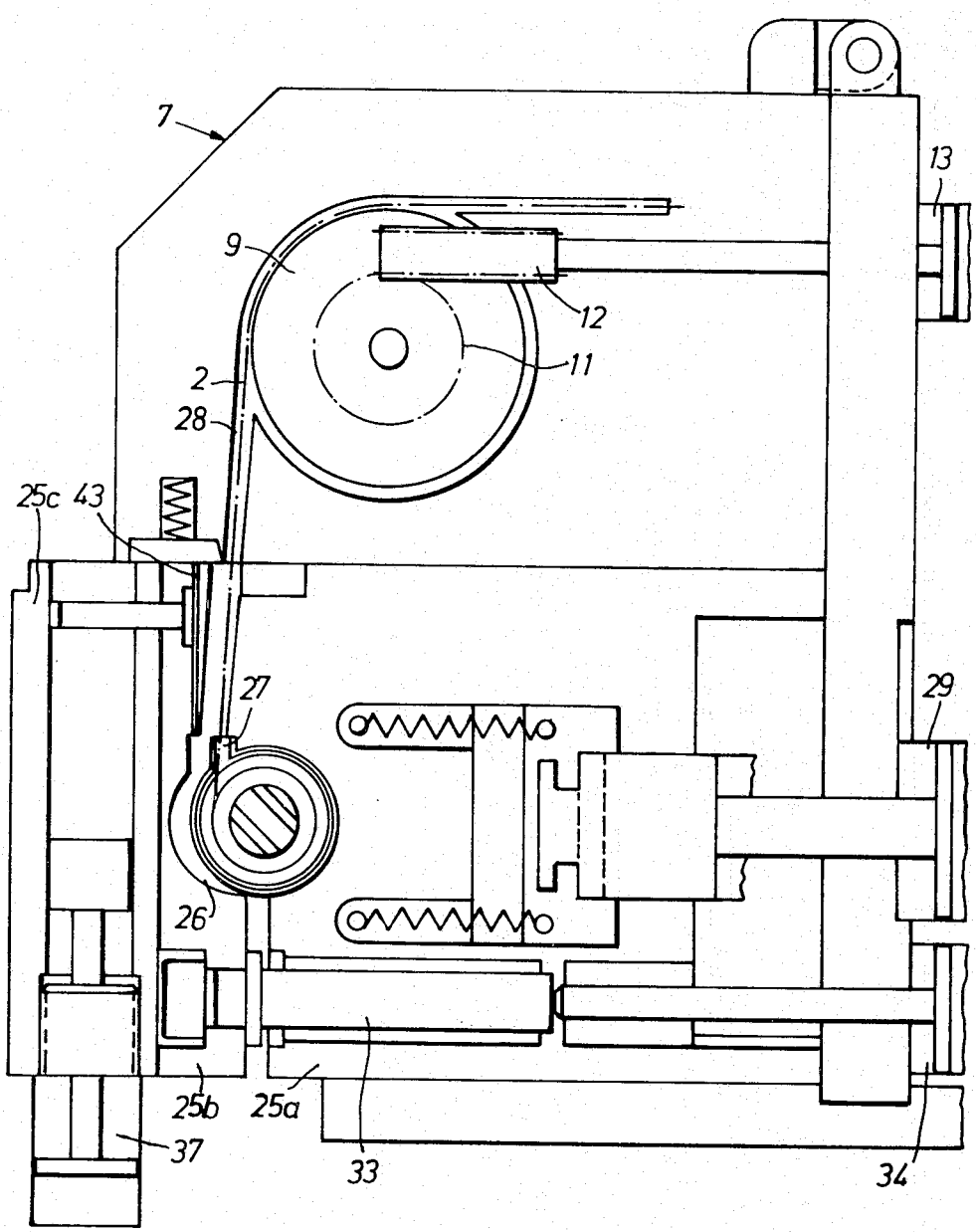
Figure 5:
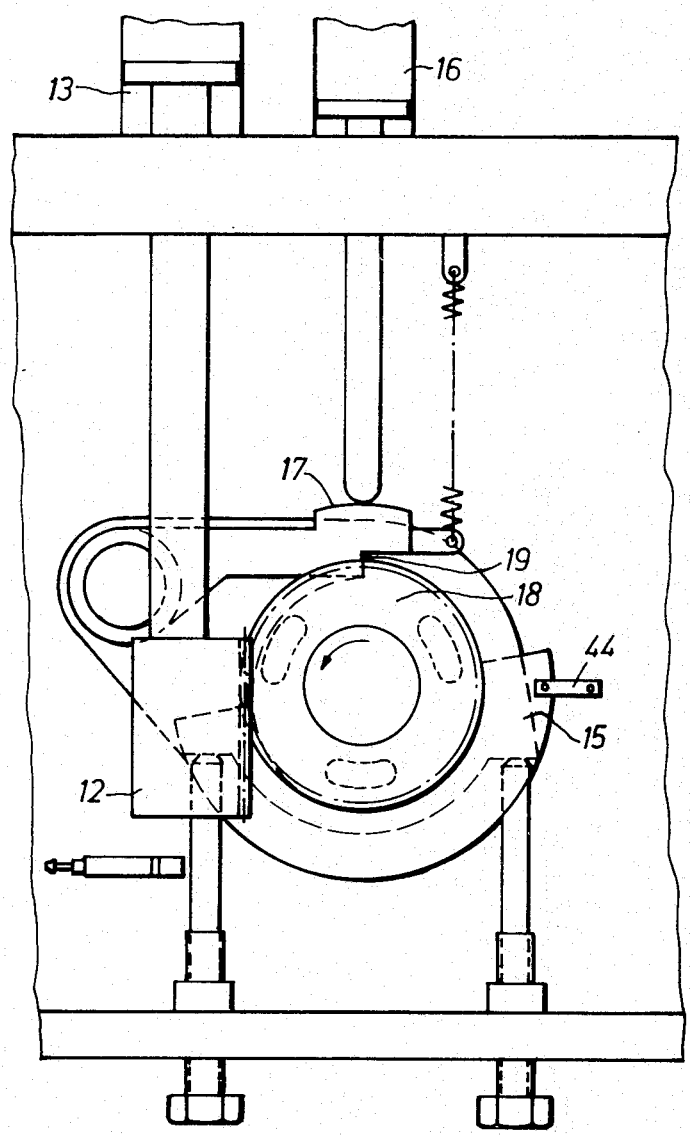
Figure 6:
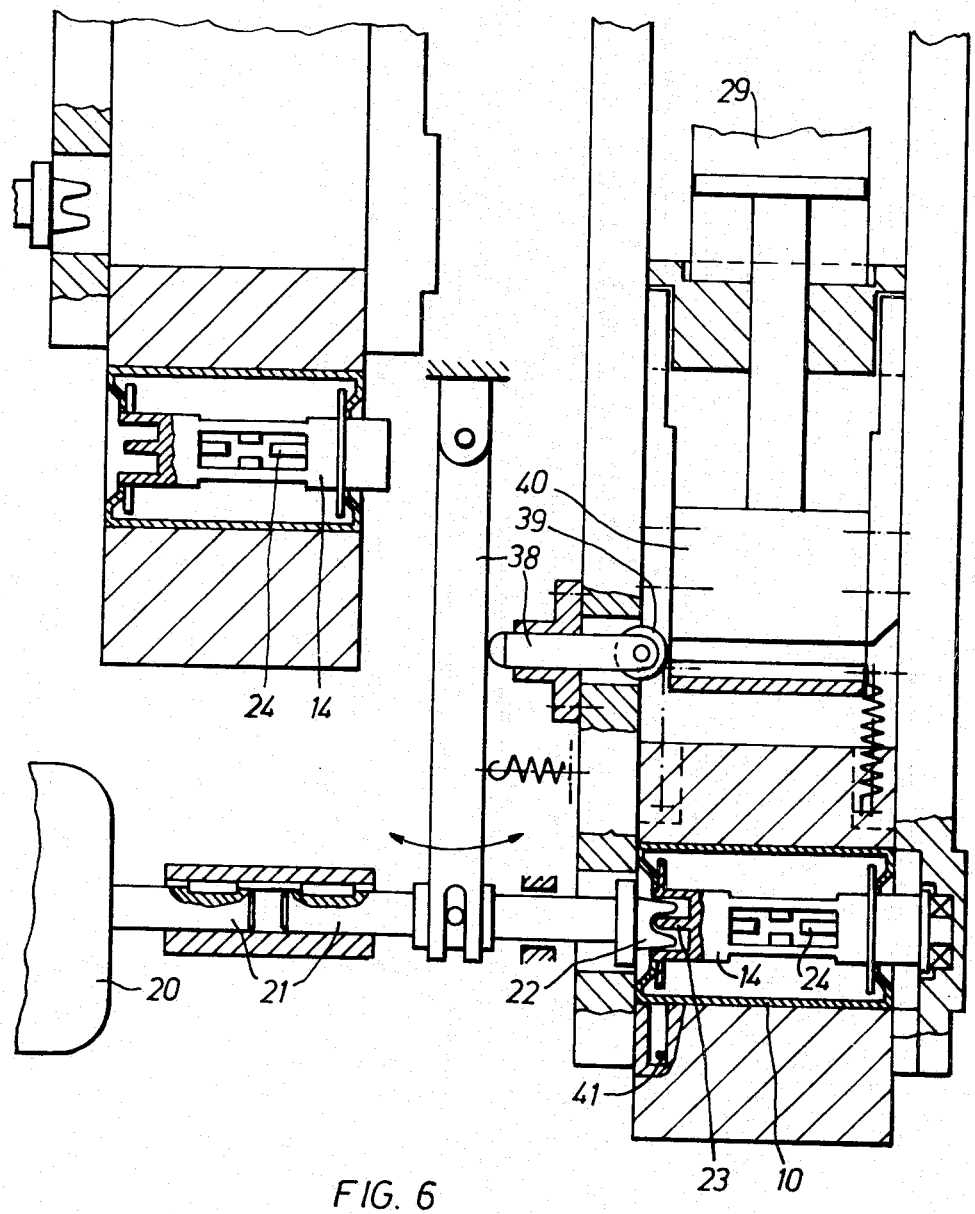
Figure 7:
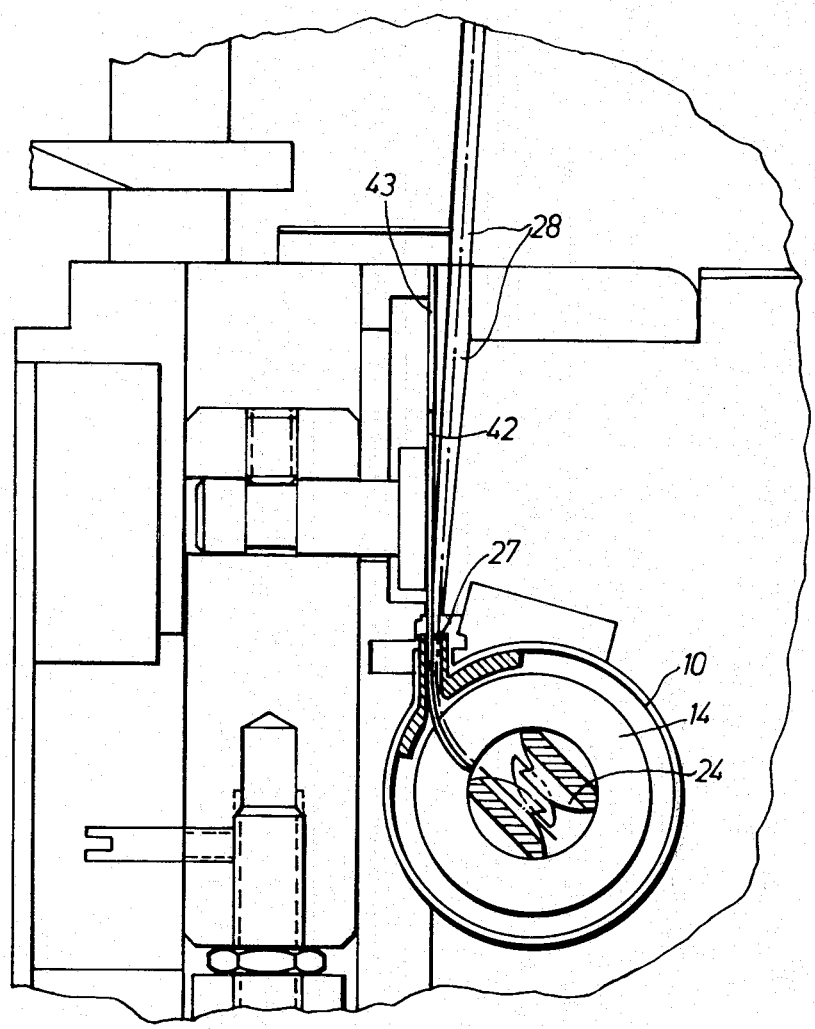
Figure 8:
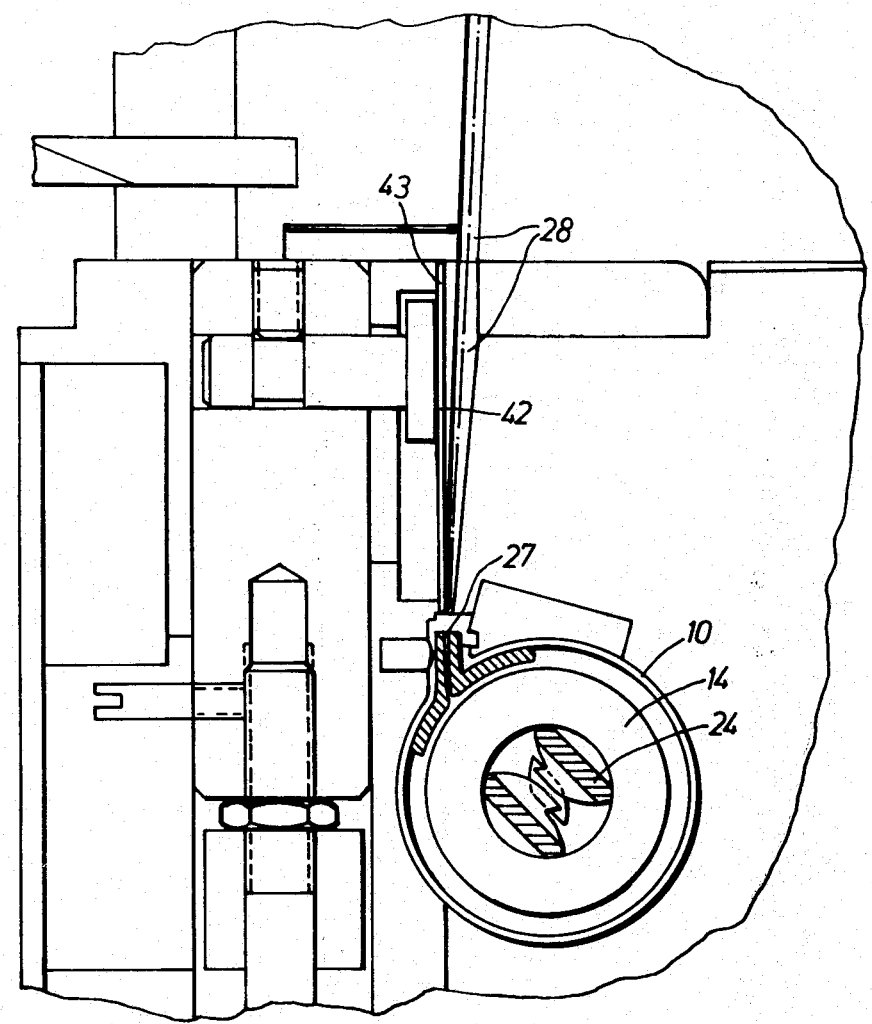

In the accompanying drawings:

FIG. 1 shows how the winding machine is incorporated in a fabrication line.
FIG. 2 shows the transport system and the cassette chamber in the starting position.
FIG. 3 shows the transport system and the cassette chamber in the threading position.
FIG. 4 shows the cassette chamber with a widened film-guide channel.
FIG. 5 shows a detent for stopping the transport system in a certain position.
FIG. 6 shows the winding drive for the film spool.
FIG. 7 shows the threading device with the guide tongue inserted into it.
FIG. 8 shows the threading device with the guide tongue removed.

As shown in FIG. 1, a film 2 is offwound from a supply roll 1 guided over a loop former 3, and then passes through a lightproof gate 5 built into a wall 4 to a winding machine 6. The loop former 3 serves as a film reservoir and ensures that the film 2 remains under constant tension. The winding machine 6 is accommodated in a lit room and the supply roll 1 in a dark room. The dividing wall 4 separates the two rooms from one another. The light gate 5 is built into the dividing wall so that both the supply roll 1 and the winding machine 6 can be replaced without light entering the remaining part. A suitable light gate is described for example in German patent application P 22 50 371.5.

The winding machine 6 includes a transport system 7, a cassette chamber 8, a winding drive for the film spool in the cassette chamber and a threading device.

The winding machine is illustrated in detail in FIGS. 2 to 4.

1. Transport System.

The transport system 7 for transporting the film in the winding machine comprises a toothed drum 9 which engages in perforations of the film 2. The dimensions of the drum are such that the length of film to be wound on to the spool is a whole or divisible multiple of its circumference. The length measurement is then simply carried out by a revolution counter.

The transport system only comes into operation during threading. During the threading operation, it pushes the beginning of the film into the film cassette 10. For this reason, an intermittent drive is sufficient. In the present case, the drive comprises a pinion 11 which is driven by the rack 12. The rack 12 is connected to a pneumatic control element 13 (FIG. 3) in the form of a pneumatic cylinder. Advance and rate of advance can be adjusted by the choice and positioning of the pneumatic control element 13. The drive is such that in the direction of film advance it is interlocking or forcelocking and freely rotatable in the opposite direction. Accordingly, the film 2 can readily be withdrawn from the film cassette 10. In conjunction with the film-length counter, this is a simple way of determining whether the beginning of the film has been attached to the film spool 14 in the cassette 10. The control and counting function of the toothed drum is achieved by virtue of the fact that, after the film has been threaded and attached to the spool and after the winding drive has been switched on by way of the film 2 moved by the film spool 14 in the transport direction, one or more impulse generators 15 (cf. FIG. 5) arranged on the drum shaft rotate with the drum 9. The impulse generators 15 release one or more counting impulses per revolution. The length of the film can be determined in this way. After the prescribed number of counting impulses has been reached, the winding drive is switched off and the drum stopped in a predetermined end position. This end position is held by virtue of the fact that, through a pneumatic control element controlled by it, the impulse generator 15 applies a braking and positioning detent 17 to a corresponding ratchet wheel 18. The positioning detent 17 drops in in sufficient time to ensure continuation to a stop 19. The stop 19 defines the holding position of the drum 9 and hence the position of the end of the film.

2. The Spool Aligning and Winding Drive

The drive for the film spool 14 comprises a two-pole synchronous motor 20 (cf. FIG. 6) which rotates the film spool 14 through a telescopic shaft 21. At its end, the telescopic shaft has an M-shaped coupling which engages in the corresponding counterpart 23 of the film spool 4. Before any threading operation, the film spool has to be aligned relative to the cassette opening so that the beginning of the film engages fastening elements 24 of the film spool 14. If this were not done the beginning of the film would slide past the core of the spool 14 and would not engage the fastening elements 24.

For alignment, the film spool 14 is first set rotating by the synchronous motor 20. The a.c. voltage is then switched off by control 50 and at the same time a d.c. voltage is applied to the stator winding by control 50. In this way, the shaft is decelerated and finally is brought to rest in a position which is determined by the angular position of the rotor magnets relative to the stator winding receiving the d.c. voltage. This effect ensures that the fastening elements 24 of the film spool 14 are brought into the correct position relative to the cassette opening before each threading operation.

3. The Cassette Chamber

The cassette chamber 8 (FIG. 1) comprises a three-part block (blocks 25a, 25b, 25c in FIGS. 2 to 4) which is displaceable transversely of the film transporting direction by means of a carriage guide. In FIG. 2, the cassette chamber 8 is in its starting or preparing position. In this position, a cassette receiver 26 formed in the cassette chamber is automatically loaded with a film cassette 10. The cassette receiver 26 is adapted in shape to the film cassette 10. It is in the form of a cylindrical hollow space which is correspondingly widened at the location of the cassette opening 27. This communicates with a film-guide channel 28 through which the film 2 is pushed during threading.

The cassette chamber 8 is displaced by a pneumatic control element 29 which is also controlled from the central logic circuit. The starting position (FIG. 2) and to an even greater extent the winding position (FIGS. 3 and 4) have to be maintained with great precision. Even slight deviations are sufficient to jeopardise satisfactory guiding of the film 2 during threading. For this reasons, a precision adjustment is provided for adjusting the stroke of the pneumatic control element 29. Stroke adjustment is obtained by means of a special fastening of the piston rod to the cassette chamber 8. At its end, the piston rod is attached by a tongue and groove 30 to a plate 31 which is connected by one or more adjusting screws of the bottom part 25a of the cassette chamber 8. The spring elements 32 apply a return force in the event of any increase in the stroke h.

The dividing plane between the bottom part 25a and the middle part 25b of the cassette chamber 8 extends through the cassette receiver 26 and through the film-guide channel 28. The outer part 25c and the middle part 25b are mounted on a carriage guide 33 in the bottom part 25a. This mounting arrangement enables the film-guide channel 28 and the cassette receive 26 to be widened (cf. FIG. 4). This possibility is frequently used when dealing with films having a particularly sensitive surface.

The bottom part 25a is the largest and most important part of the cassette chamber 8. It contains the adjustable mounting 30, 31, 32 to which the pneumatic control elements 29 for the reciprocating movement of the cassette chamber is attached. In addition, the bottom part 25a contains the carriage guide 33 for the middle part 25b and the outer part 25c, and also the major part of the cassette receiver 26 and film-guide channel 28. In addition, a fixed lower blade 35 is arranged on the bottom part 25a at the outlet of the film-guide channel 28. Together with the upper blade 36 resiliently attached to the transport system 7, it is used to cut the film 2 after a predetermined length of film has been wound on the film spool 14. The film 2 is automatically served when the cassette chamber returns from the winding position to the starting position.

The middle part 25b contains the rest of the cassette receiver 26 and film-guide channel 28 and also the threading device which will be described hereinafter. The outer part 25c essentially contains only the control element 37 for actuating the threading device.

When the cassette chamber 8 is moved from the starting position to the winding position, the telescopic shaft 21 is automatically connected to the film spool 14 through a mechanical control element (cf. FIG. 6). The mechanical control element consists of a lever mechanism 38 and a cam 39 which convert the transverse movement of the cassette chamber 8 into an axial movement of the telescopic shaft 21. The cam 39 follows an inclined curved surface which is formed on an intermediate member 40 at the end of the piston rod of the pneumatic control element 29. After the telescopic shaft 21 has engaged the film spool 14, the film spool is aligned relative to the cassette opening 27 as already described. The threading operation is then commenced.

The operation of the cassette chamber 8 is as follows:

A cassette 10 with a film spool 14 is introduced into the cassette receiver 26 from a cassette conveyor (not shown). At the same time, the preceding cassette with film wound thereon is ejected and the sensor 41 (FIG. 6) damped. This impulse controls the movement of the cassette chamber 8 into the threading and winding position, actuation of the threading device and switching on of the winding motor 20 after the telescopic shaft 21 of the motor has engaged the film spool 14.

This is followed by the threading and winding operation which are described below. On completion of this operation, the cassette chamber 8 is returned from the winding position to the starting position, FIG. 2. During the movement of the cassette chamber, the telescopic shaft 21 is gradually separated from the film spool 14. In addition, the film is cut by the pair of blades 35, 36 during return to the starting position.

Advantageously the cassette chamber 8 is such that a single control element by which it is displaced carries out five functions one after the other namely:

1. Reloading the cassette receiver 26 with an empty cassette 10.
2. Bringing the cassette 10 into the threading and winding position.
3. Controlling the telescopic shaft 21 connected to the aligning and winding drive.
4. Cutting the film by means of the built-in lower blade and the upper blade 35 on the transport system 7.
5. Ejecting the full cassette 10 from the cassette receiver.

The Theading and Winding Device

The threading device is accommodated in the middle part 25b and outer part 25c (FIG. 2) of the cassette chamber 8. As shown in FIGS. 7 and 8, it consists of a leaf spring 42 which can be inserted into the cassette 10 through the cassette opening 27. The leaf spring is preformed (bent) so that it is curved in its relaxed state. Thus, when it is inserted into the cassette, the leaf spring curves towards the winding shaft. The leaf spring 42 is about as wide as the film. Its length and the length of the linear receiving duct 43 are such that the end of the inserted leaf spring projects only a few millimeters beyond the winding core of the film spool 14 (FIG. 7). The leaf spring is 0.1 to 0.5 mm thick. The material for the spring is steel or an alloy with a high modulus of elasticity.

It is important for the film 2 to be guided along the inside on the leaf spring 42, i.e. the film is guided on that side facing the centre of curvature. It is only in this way that the film can be reliably brought into engagement with the fastening elements 24 of the film spool 14. The film is prevented from deflecting to a larger radii of curvature. In the rest position, i.e. on completion of the threading operation, the leaf spring 42 is situated in the receiving duct 43 which opens at an acute angle into the film-guide channel 28 at the cassette opening 27. This construction provides an excellent solution to the critical problem of cleanly guiding the film during threading. For this reason, the film-guide channel 28 extends right up to the cassette opening 27. It is also important for the film to be guided in a straight line between the cassette opening 27 and the transport drum 9. This prevents the film from being scratched and scored during winding. Particularly in the case of highly sensitive films, any surface damage would result in unacceptable faults in the film.

Introduction of the leaf spring 42 before the film is threaded into the cassette 10 and its removal on completion of threading are carried out by a pneumatic control element 37 which is built into the outer part 25c of the cassette chamber 8. It is also connected to the central control circuit.

After an empty film cassette 10 has been introduced into the cassette receiver 26 (FIGS. 2 to 4), the threading device is actuated by the impulse of the cassette chamber sensor 41 (FIG. 6). The pneumatic control element 37 pushes the leaf spring 42 out of the receiving duct 43 into the film cassette 10. The cassette chamber 8 then moves into the winding position and during this movement couples the telescopic shaft 21 with the film spool 14 (FIG. 6). The spool is then aligned in the manner already described. The film is then advanced through the film-guide channel 28 by the transport drum 9 until it engages the fastening elements 24 of the film spool 14, the film sliding over the concave inner surface of the leaf spring 42. The position of the drum 9 is then checked by a sensor 44 (cf. FIG. 5), the leaf spring 42 withdrawn and the winding motor 20 switched on. In the case of film with a particularly sensitive surface, the bottom part 25a and the middle part 25b of the cassette chamber can be moved apart from one another during winding by means of the guide 33 and the pneumatic control element 34. This widens the film guide channel 28 so that there is no danger of the film coming into contact with any fixed parts of the machine. After the predetermined length of film has been wound on to the spool in the cassette 10, as measured by the impulse generators 44 and 15 (cf. FIG. 5) on the drum 9, the transport drum 9 is stopped in a predetrmined end position by means of the positioning detent 19 and the ratchet wheel 18 (FIG. 5). Thereafter the cassette chamber 8 returns to the starting position, the telescopic shaft 21 being separated from the film spool 14 whilst at the same time the film is cut at the boundary between the cassette chamber 8 and the transport system 7. The full cassette 10 is then ejected from the cassette receiver 26 and the cassette receiver loaded with a new cassette. The winding machine is thus ready for the next working cycle.

The present embodiment has been concerned with the fabrication of film cassettes, although with minor modifications the winding machine according to the invention is also generally suitable for winding band-form materials on to winding cores.

What we claim is:

1. A machine for automatically winding a film on to a spool in a cassette, comprising a cassette chamber in a cassette chamber block for receiving the film cassette including the film spool, a threading device for the film connected to the cassette chamber and block, a film transport system disposed in a film transport block and a film windong drive, wherein:

a. the casette chamber has a film guide channel, slide coupling means connecting said cassette chamber and film transport blocks whereby said cassette chamber block is displaceable transversely of the direction in which the film is transported thereby to enable said cassette chamber to be brought from a cassette-preparing position in which said cassette chamber and its film guide channel are misaligned with said film transport system into a winding or threading position in which said cassette chamber and its film guide channel are aligned with said film transport system.

b. a telescopic winding shaft being disposed adjacent the cassette chamber, mechanical control elements connecting the telescopic winding shaft to the cassette chamber so that during its displacement, the cassette chamber moves the telescopic winding shaft axially through the mechanical control elements until it engages by force with the film spool in the cassette and c. a control circuit is connected to initially actuate the threading device and the film transport system whereby the beginning of the film is pushed through the film guide channel into the cassette where it automatically engages the film spool.

2. A machine as claimed in claim 1, wherein the threading device comprises a long and thin leaf spring for insertion into the cassette, a linear receiving duct in the cassette chamber in which the leaf spring is guided, a reciprocating means connecting the leaf spring to the film guide chamber for moving it into and out of the cassette, the leaf spring possessing a natural curvature with a concave inner surface whereby after it has been inserted into the cassette a part thereof curves towards the winding shaft, the film spool having fastening elements, the film-guide channel extending obliquely of the linear receiving duct and opening into the cassette opening on the inside of the partly curved surface of the leaf spring so that during threading the beginning of the film slides along the concave inner surface of the leaf spring and engages the fastening elements of the film spool.

3. A machine as claimed in claim 1, wherein the cassette chamber is connected to a pneumatic piston which at the beginning of winding brings the chamber into the winding position and, after the required length of film has been wound on to the film spool, returns the chamber to the starting position.

4. A machine as claimed in claim 3, wherein the cassette chamber is fixed through an intermediate member to the pneumatic piston which is adjustable in its travel relative to the end of the piston rod by means of adjusting screws.

5. A machine as claimed in claim 1, wherein the cassette chamber contains a cassette receiver the film guide channel and the threading device.

6. A machine as claimed in claim 5, wherein the cassette chamber is a three-part block and the dividing line between the first and second block extends along the middle line of the film-guide channel and wherein the second block is displaceable to a limited extent along a guide relative to the first block by means of a pneumatic control element thereby to widen the film-guide channel.

7. A machine as claimed in claim 1, wherein a fixed lower cutting blade is mounted on the cassette chamber block at the point where the film guide channel opens into the cassette chamber, and a resiliently mounted upper cutting blade is arranged at the point where the film leaves the transport system, so that the film is severed when the cassette chamber returns to its starting position.

8. A machine as claimed in claim 1, wherein the transport system comprises a supporting block with film guide channels in which is mounted a driven toothed drum which engages in perforations of the film.

9. A machine as claimed in claim 8, wherein the drive of the toothed drum comprises a rack drive which is actuated by a pneumatic control element.

10. A machine as claimed in claim 9, wherein the drive of the toothed drum is force-locking in the transport direction and is freely rotatable in the opposite direction.

11. A machine as claimed in claim 8, wherein the length of film to be wound on is an integral multiple of the circumference of the toothed drum and wherein the toothed drum is connected to a counter which controls the winding operation and thereafter initiates return of the cassette chamber to the starting position.

12. A machine as claimed in claim 8, wherein a pivotal braking and positioning detent in the dorm of a stop for a ratchet wheel fixedly mounted on the drum shaft is provided for stopping the toothed drum in a predetermined position.

13. A machine as claimed in claim 1, wherein the winding drive comprises a synchronous motor which drives the film spool in the cassette through the telescopic shaft, and wherein a control is provided which switches off an a.c. voltage to a stator winding of the motor after the telescopic shaft has engaged the film spool and instead switches on a d.c. voltage so that the synchronous motor is braked and comes to a stop in a certain predetermined position determined by the angular position of rotor magnets of the motor and the stator winding receiving d.c. voltage.

* * * * *